(12) United States Patent
Jung et al.

(10) Patent No.: US 9,508,017 B2
(45) Date of Patent: Nov. 29, 2016

(54) DEVICE FOR CAPTURING IMAGE OF IRIS AND USER RECOGNITION DEVICE APPLYING SAME IN ORDER TO CONTROL ACCESS

(71) Applicants: Gil-Soo Jung, Hwaseong-si (KR); You-Jung Kim, Hwaseong-si (KR)

(72) Inventors: Gil-Soo Jung, Hwaseong-si (KR); You-Jung Kim, Hwaseong-si (KR)

( * ) Notice: Subject to any disclaimer, the term of this patent is extended or adjusted under 35 U.S.C. 154(b) by 0 days.

(21) Appl. No.: 14/379,102

(22) PCT Filed: Feb. 15, 2013

(86) PCT No.: PCT/KR2013/001192
§ 371 (c)(1),
(2) Date: Aug. 15, 2014

(87) PCT Pub. No.: WO2013/122414
PCT Pub. Date: Aug. 22, 2013

(65) Prior Publication Data
US 2015/0356364 A1     Dec. 10, 2015

(30) Foreign Application Priority Data

Feb. 16, 2012  (KR) .................. 10-2012-0015641
Apr. 19, 2012  (KR) .................. 10-2012-0040748
Apr. 19, 2012  (KR) .................. 10-2012-0040750

(51) Int. Cl.
*G06K 9/00* (2006.01)
*G06T 7/00* (2006.01)

(52) U.S. Cl.
CPC ....... *G06K 9/00912* (2013.01); *G06K 9/00006* (2013.01); *G06K 9/00604* (2013.01); *G06K 9/00617* (2013.01); *G06T 7/004* (2013.01);

(Continued)

(58) Field of Classification Search
None
See application file for complete search history.

(56) References Cited

U.S. PATENT DOCUMENTS

| | | | |
|---|---|---|---|
| 2004/0108474 A1 | 6/2004 | Kato | .................. 250/559.4 |
| 2007/0052959 A1* | 3/2007 | Cottard | .............. G06K 9/00919 356/364 |
| 2010/0278394 A1* | 11/2010 | Raguin | .............. G06K 9/00604 382/117 |

FOREIGN PATENT DOCUMENTS

| | | | |
|---|---|---|---|
| EP | 1 172 063 A2 | 1/2002 | |
| EP | 1 172 063 A3 | 1/2002 | |

(Continued)

OTHER PUBLICATIONS

D. Zhang, "Automated Biometrics, Technologies and Systems," Kluwer Academic Publishers, pp. 248-249, 2000.

*Primary Examiner* — Chan Park
*Assistant Examiner* — Geoffrey E Summers
(74) *Attorney, Agent, or Firm* — Fitzpatrick, Cella, Harper & Scinto

(57) ABSTRACT

Disclosed are a device for capturing an image of the iris and a user recognition device applying same in order to control access. According to one embodiment of the present invention, the device for capturing an image of the iris includes: a first light source corresponding to the left eye; a second light source corresponding to the right eye; a first duct disposed adjacent to the first light source for restricting the illumination angle of the first light source; a second duct disposed adjacent to the second light source for restricting the illumination angle of the second light source; a half mirror transmitting the light emitted from the first and second light sources in order to direct the light onto the left and right eyes, wherein the half mirror reflects the images of the left and right eyes; and left/right cameras respectively photographing the left and right eyes in order to recognize the irises.

10 Claims, 10 Drawing Sheets

(52) U.S. Cl.
CPC ............... *G06T2207/10004* (2013.01); *G06T 2207/10024* (2013.01); *G06T 2207/10152* (2013.01); *G06T 2207/30201* (2013.01)

(56) References Cited

FOREIGN PATENT DOCUMENTS

| | | |
|---|---|---|
| JP | 63-202728 A | 8/1988 |
| JP | 2001-061785 A | 3/2001 |
| JP | 2004-184281 A | 7/2004 |
| JP | 2005-100063 A | 4/2005 |
| JP | 2005-309901 A | 11/2005 |
| JP | 2006-158827 A | 6/2006 |
| JP | 2006-277730 A | 10/2006 |
| JP | 2007-508610 A | 4/2007 |
| JP | 2007319175 A * | 12/2007 |
| KR | 20-0268740 Y1 | 3/2002 |
| KR | 10-2003-0091395 | 12/2003 |
| KR | 10-2009-0076038 A | 7/2009 |
| KR | 10-2009-0106790 A | 10/2009 |
| KR | 10-2009-0106791 A | 10/2009 |
| KR | 20-2011-0009084 U | 9/2011 |
| WO | WO 00/39760 | 7/2000 |
| WO | WO 2007/139085 A1 | 12/2007 |

* cited by examiner

DEVICE FOR CAPTURING IMAGE OF IRIS AND USER RECOGNITION DEVICE APPLYING SAME IN ORDER TO CONTROL ACCESS

TECHNICAL FIELD

The present invention relates to a device for capturing images of the irises and a user recognition device using the same that are used to control access to a place requiring the verification of identity or special permission, and, more particularly, to a device for capturing images of the irises and a user recognition device using the same that guide a user to a location away from an iris recognition device and suitable for the capturing of images and then effectively capture images of the irises.

The present invention claims the benefit of the filing dates of Korean Patent Application No. 10-2012-0015641, filed Feb. 16, 2012, Korean Patent Application No. 10-2012-0040748, filed Apr. 19, 2012, and Korean Patent Application No. 10-2012-0040750, filed Apr. 19, 2012, which are hereby incorporated by reference herein in their entirety.

BACKGROUND ART

As interest in biometric recognition has increased in the security market, the market has expanded. The present invention pertains to the iris recognition sector of the biometric recognition field. Biometric recognition devices respond to various directions from which users approach them. However, since the directions from which users approach the devices are significantly different and varied depending on surrounding environments or the psychology of users, it is substantially difficult to make responses to all possible directions. Accordingly, there is a need for a user guidance method and device that are capable of improving the rate of recognition without deterring users.

Devices for capturing images of the irises are devices that allow light emitted from a light source to be reflected from the eyes of an iris-recognition target person and to enter cameras, extract images of the irises from images of the eyes, compare the images of the irises with iris data previously stored in a database, and then identify the irises.

In this case, in order to capture accurate images of the irises, a user should be located at a precise location for an iris recognition device. That is, the iris recognition device can capture accurate images of the irises only if it has guided a user to a precise location an appropriate distance away from the iris recognition device.

Iris recognition devices should capture images of the irises of users via cameras. In order to capture the irises of a user, a certain indicator is shown to a user and then the user is made to be positioned at an appropriate location while viewing the indicator. Although the types of indicators that can be presented are various, a single light source (an LED) is generally used as an indicator for the recognition of the irises. Furthermore, a half mirror is used to allow the user to determine whether he or she is accurately viewing the indicator.

FIG. 1 is a configuration diagram of a conventional device for capturing images of the irises. In a conventional device 100 for capturing images of the irises, when a user views a single indicator 101 through a half mirror 104, the user views a virtual image in which the indicator is located between the two eyes. This conventional device 100 for capturing images of the irises operates without any problem for users having a small difference in the field of vision between their two eyes.

However, in the case of a user having a large difference in the field of vision between his or her two eyes, the user should move his or her face to the left and right in order to locate the virtual image of the indicator between the two eyes.

FIGS. 2 and 3 illustrate this phenomenon.

FIG. 2 illustrates the case of a user having a good field of vision in his or her left eye, and FIG. 3 illustrates the case of a user having a good field of vision in his or her right eye.

Referring to FIG. 2, it can be seen that the field of vision of the left eye of the user is wider than that of the right eye of the user. In this case, when the user determines via the half mirror 204*a* of an iris recognition device 200*a* that an indicator LED 201*a* is located between his or her two eyes, the indicator LED 201*a* may be in the state of being biased to the left in reality. In this case, the left and right cameras 203*a* and 202*a* of the iris recognition device 200*a* cannot accurately capture the two eyes of the user.

Referring to FIG. 3, it can be seen that the field of vision of the right eye of the user is wider than that of the left eye of the user. In this case, when the user determines via the half mirror 204*b* of an iris recognition device 200*b* that an indicator LED 201*b* is located between his or her two eyes, the indicator LED 201*b* may be in the state of being biased to the right in reality. In this case, the left and right cameras 203*b* and 202*b* of the iris recognition device 200*b* cannot accurately capture the two eyes of the user.

The phenomena of FIGS. 2 and 3 occur in the case of users having large differences in the field of vision between their two eyes. So far, the reason why the conventional device for capturing images of the irises does not work for these users cannot be determined. In real life, when a human views an object at a specific location while covering only the left eye or only the right eye, the human feels that the object is viewed as moving from the left to the right or as moving in the reverse direction. This phenomenon is the reason why the right camera cannot accurately capture an image of the right eye and the left camera cannot accurately capture an image of the left eye, as illustrated in FIGS. 2 and 3.

In addition to iris recognition, there are various methods of recognizing a user, such as fingerprint recognition, recognition using a smartcard, etc. The market for access control using user recognition was opened and has been continuously expanding. Such access control technology have been used not only in the military and airports for the control of entry and exit into and from a security area but also in luxury apartments, prisons and fitness centers for the management of entry and exit and absenteeism and tardiness.

DISCLOSURE

Technical Problem

An object of the present invention is to allow a device for capturing the images of the irises that belongs to an iris recognition device to guide a user to a location that is optimal for the capturing of images of the irises, thereby enabling images of the irises to be effectively captured.

Another object of the present invention is to allow even a user having a large difference in the field of vision between his or her two eyes to gradually approach an iris recognition device from a remote location and to move so that a single light source is located between his or her two eyes at the time at which two light sources viewed through a half mirror are viewed as the single light source, thereby guiding the user to a location that is optimal for the capturing of images of the irises.

A further object of the present invention is to appropriately limit the irradiation angles of rays of light generated by two light sources so that the rays of light generated by the two light sources are not mixed with each other up to an appropriate location in order to guide a user to a location that is optimal for the recognition of the irises.

Yet another object of the present invention is to provide a user recognition device that is capable of recognizing a user by capturing the irises of the user at an optimal location and then performing iris recognition, by reading a smartcard of the user, or by recognizing a fingerprint of the user.

Technical Solution

In order to accomplish the above objects, the present invention provides a device for capturing images of the irises, including a first light source adapted to correspond to the left eye; a second light source adapted to correspond to the right eye; a first duct disposed close to the first light source, and configured to limit the irradiation angle of the first light source; a second duct disposed close to the second light source, and configured to limit the irradiation angle of the second light source; a half mirror configured to transmit light emitted by the first and second light sources to irradiate the left and right eyes, and also configured to reflect the appearances of the left and right eyes; and left and right cameras configured to capture the left and right eyes to perform iris recognition.

In this case, the center of the half mirror may be located at the midpoint between the first and second light sources.

In this case, the distance between the first and second light sources may be set such that, when a location of a user corresponding to the left and right eyes is a preset distance away from the half mirror, the user recognizes the first and second light sources as a single light source.

In this case, the preset distance may range from 30 to 37 cm, and the distance between the first and second light sources may range from 1 to 3 cm.

In this case, the distance between each of the first and second light sources and the half mirror may range from 2.5 to 4.5 cm.

The first and second ducts may be respective cylindrical tubes in close contact with the first and second light sources, and the half mirror-side sections of the cylindrical tubes may be formed at an oblique angle ranging from 60 to 80 degrees, thereby significantly limiting the center-side irradiation angle of the half mirror compared to the outside angle thereof.

The first and second ducts may be arranged perpendicular to the extended direction of the half mirror.

The first and second ducts may include respective threads formed in the insides of cylinders.

Additionally, in order to accomplish the above objects, the present invention provides a user recognition device for access control, including an iris recognition unit configured to capture the left and right eyes and then recognize a user through iris recognition; a fingerprint recognition unit configured to recognize the user through the recognition of a fingerprint of the user; a smart card recognition unit configured to recognize the user through the recognition of a smart card of the user; and an LCD panel unit configured to receive data through the recognition of one or more touches of the user and provide a user interface to the user.

In this case, the iris recognition unit may include a first light source adapted to correspond to the left eye; a second light source adapted to correspond to the right eye; a first duct disposed close to the first light source, and configured to limit the irradiation angle of the first light source; a second duct disposed close to the second light source, and configured to limit the irradiation angle of the second light source; a half mirror configured to transmit light emitted by the first and second light sources to irradiate the left and right eyes, and also configured to reflect the appearances of the left and right eyes; and left and right cameras configured to capture the left and right eyes to perform the iris recognition.

In this case, the iris recognition unit may be rotatable in upward and downward directions so that the angle of view of each of the left and right cameras is in the range of 30 degrees in the upward direction and 30 degrees in the downward direction.

In this case, the center of the half mirror may be located at the midpoint between the first and second light sources.

In this case, the distance between the first and second light sources may be set such that, when the location of the user corresponding to the left and right eyes is a preset distance away from the half mirror, the user recognizes the first and second light sources as a single light source.

The preset distance may range from 30 to 37 cm, and the distance between the first and second light sources may range from 1 to 3 cm.

The distance between each of the first and second light sources and the half mirror may range from 2.5 to 4.5 cm.

In this case, the first and second ducts may be respective cylindrical tubes in close contact with the first and second light sources, and half mirror-side sections of the cylindrical tubes are formed at an oblique angle ranging from 60 to 80 degrees, thereby significantly limiting the center-side irradiation angle of the half mirror compared to the outside angle thereof.

In this case, the first and second ducts may be arranged perpendicular to the extended direction of the half mirror.

In this case, the first and second ducts may include respective threads formed in the insides of cylinders.

Advantageous Effects

In accordance with the present invention, the problem of erroneous iris recognition occurring for users having large differences in the field of vision between their two eyes is overcome, thereby improving the rate of recognition of the irises of users.

Furthermore, the time a user can take to be able to easily determine a location via a half mirror can be provided because the user approaches from a remote location while viewing two indicators, thereby enabling the user to approach without being deterred or worried in a specific area.

Furthermore, a user can assume a position desired by a device for capturing images of the irises because the user can approach the device without being deterred or worried while taking his or her time, thereby capturing images of irises accurately and rapidly.

Moreover, the present invention performs user authentication through the recognition of the irises, fingerprint or smart card of a user, thereby effectively performing access control, such as the management of absenteeism and tardiness.

BEST MODE

Figure 1:
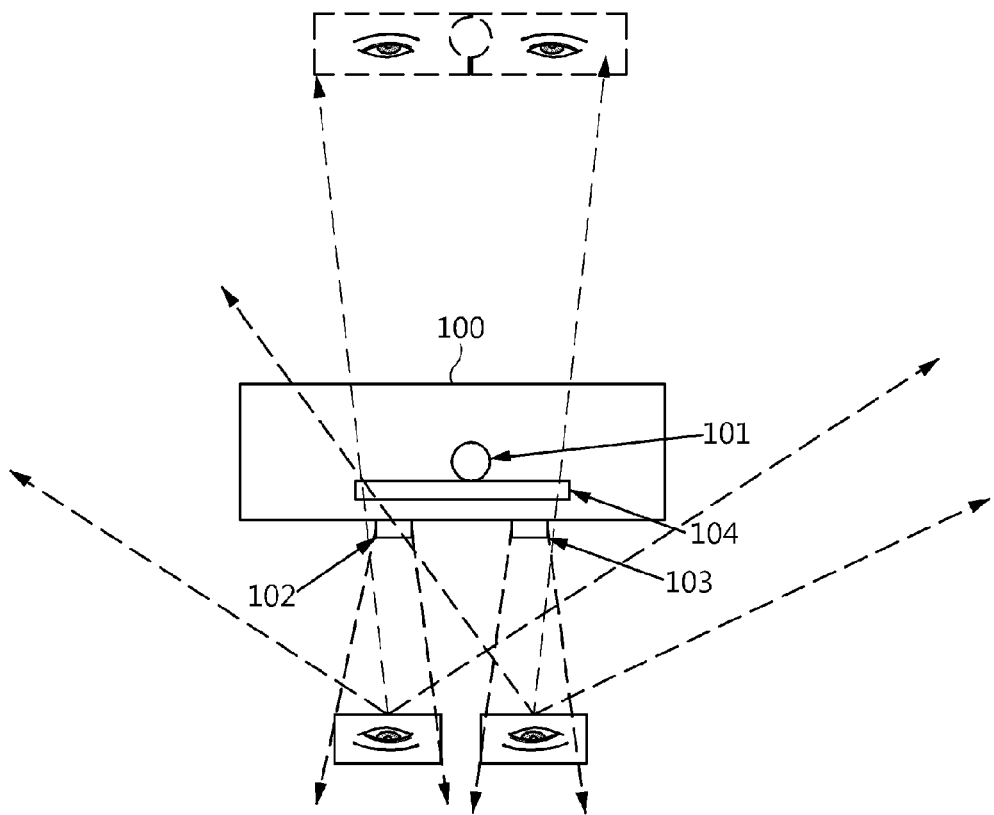
FIG. 1 is a configuration diagram illustrating the concept of a conventional device for capturing images of the irises.
Figure 2:
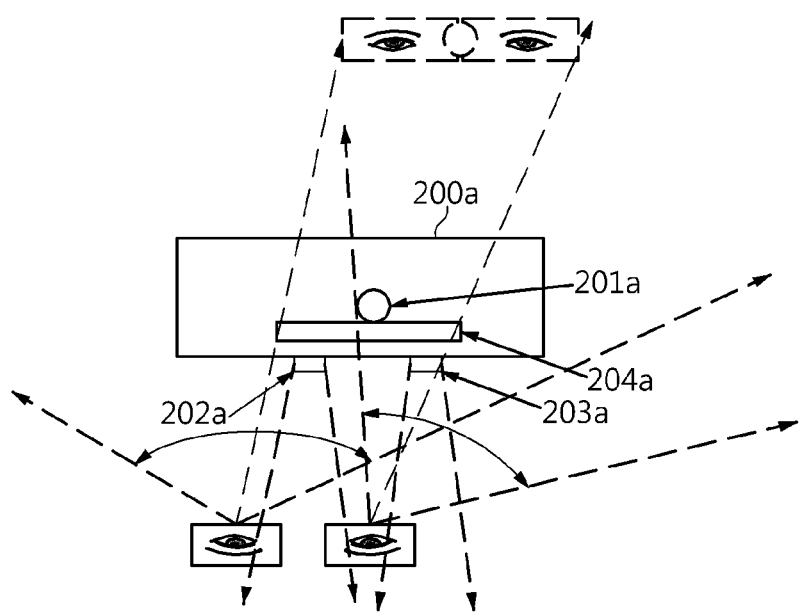
FIGS. 2 and 3 are other configuration diagrams illustrating the concept of the conventional device for capturing images of the irises.
Figure 3:
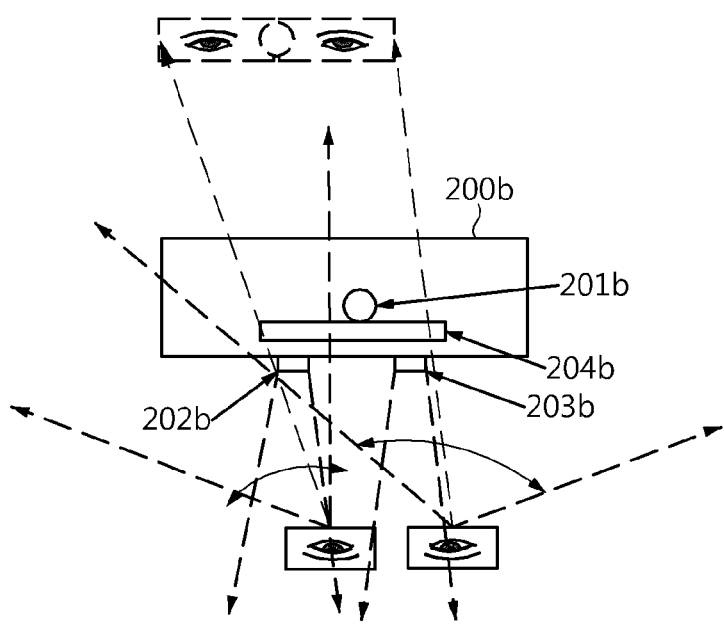

The present invention will be described in detail below with reference to the accompanying drawings. Repeated descriptions and detailed descriptions of well-known functions and configurations that may make the gist of the present invention unnecessarily obscure will be omitted below. Embodiments of the present invention are provided to fully describe the present invention to persons having ordinary knowledge in the art to which the present invention pertains. Accordingly, the shapes, sizes, etc. of components in the drawings may be exaggerated to make the description obvious.

The present invention approaches a solution to the problems via the following three assumptions based on the fact that a specific object moves from the left to the right or moves in the reverse direction when a human views the specific object while covering only the left eye or only the right eye. First, two indicators are used. Second, in order to compensate for the distance over which indication light moves due to the difference in the field of vision between the two eyes, the two indicators are disposed, in parallel with a half mirror, at locations that are about a distance of a quarter of the half mirror away from the center of the half mirror. Third, a configuration that allows only the left indicator to be visible to the left eye and only the right indicator to be visible to the right eye is provided.

Figure 4:
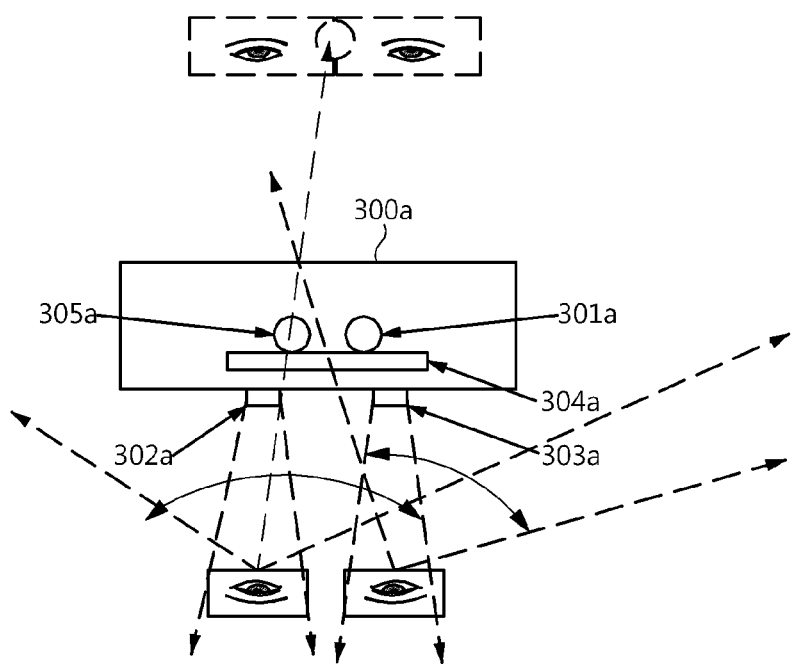
FIGS. 4 and 5 are configuration diagrams illustrating the iris recognition-related concept of a device for capturing images of the irises according to the present invention.
Figure 5:
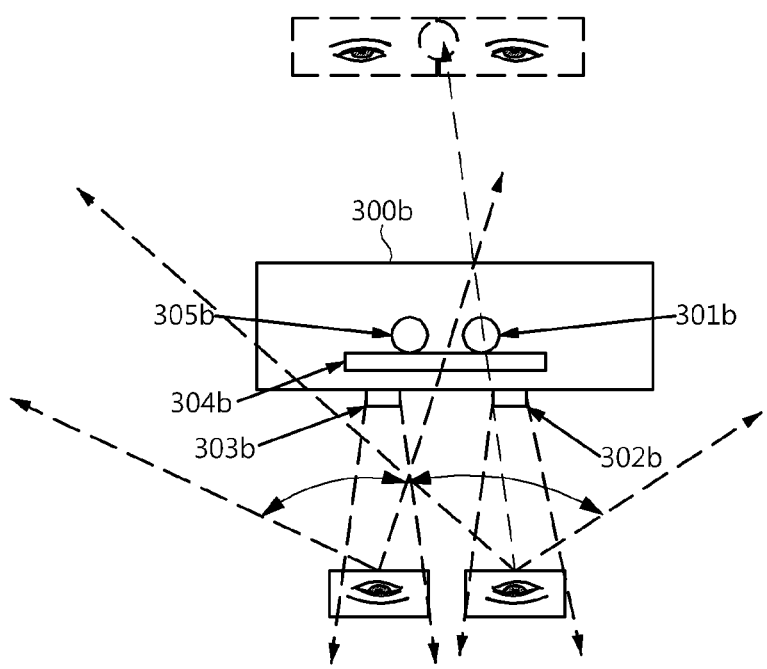

The illustrations of the above three assumptions are given in FIGS. 4 and 5. In FIGS. 4 and 5, images of the two eyes that have been outside the angles of view of left and right cameras enter the angles of view of the left and right cameras. For example, in the case where a specific object moves from the left to the right or moves in the reverse direction when a human views the specific object while covering only the left eye or only the right eye, when the human views the specific object without covering his or her two eyes, the left eye has a wider field of vision if the specific object is located on a left side, and the right eye has a wider field of vision if the specific object is located on a right side. As described above, when a user having a large difference in the field of vision between his or her two eyes is guided to a close location while viewing the two indicators through the half mirror, only a single one of the two indicators is visible to an eye having a wider field of vision at the time at which the user reaches a specific location. This location corresponds to the ranges of the angles of view of the left and right cameras, and the two eyes of the user fall within the angles of view of the left and right cameras.

The device for capturing images according to the present invention includes left and right indicators, and cylindrical tubes disposed between the indicators and a half mirror and configured to transmit light in order to adjust the angles of view of the indicators. In order to prevent light from leaking through the fixed portions of the indicators, it is preferred that the indicators come into completely close contact with the cylindrical tubes. It is preferred that the materials of the cylindrical tubes are opaque and absorb light. It is preferred that the insides of the cylindrical tubes are threaded and, thus, prevent light from being diffracted and scattered at the ends of the cylindrical tubes. It is preferred that the internal diameters of the cylindrical tubes are equal to approximately the internal diameters of the indicators. Since the indicators should be laterally aligned with respect to the half mirror, the cylindrical tubes are disposed perpendicular to the indicators and the half mirror. It is preferred that the interval between each of the indicators and the half mirror is in the range of 2.5 to 4.5 cm. In this case, in order to increase the view areas of the left and right indicators, it is preferred that the half mirror-side sections of the cylindrical tubes are formed at an oblique angle ranging from 60 to 80 degrees, thereby significantly limiting the center-side irradiation angle of the half mirror compared to the outside angle thereof.

7-color LEDs may be employed for the indicators that are used in the present invention. In this case, an advantage arises in that various light source colors can be provided, and thus corresponding light source colors are displayed in various cases, such as the case where the user is guided into an operation area, the case where the user is located excessively away from or close to the device for capturing images of the irises, the case where the user is located within the operation area, etc., thereby enabling the user to recognize the situations.

The device for capturing images of the irises according to the present invention may be configured, as follows. The device for capturing images of the irises includes a half mirror configured to indicate the situation of gazing at the device for capturing images of the irises to the user, two indicators, two cylindrical tubes configured to fix the angles of view of the indicators, two camera control units configured to capture images of the left and right irises, a center camera control unit configured to obtain a distance and identify an object (face), an indicator control unit configured to operates the indicators, an image collection control unit configured to collect the images of the left and right irises, and a USB control unit configured to transmit the iris images to a PC or the like.

The user recognition device for access control according to the present invention may include an LCD panel, a smartcard recognition unit, and a fingerprint recognition unit. Along with these units, the user recognition device for access control may include an iris recognition unit including the above-described device for capturing the images of the irises, thereby enabling various types of user authentication. In this case, one user recognition device may be used as a registration device, and the other user recognition devices may be used as devices for access control. The user recognition devices connected in the above-described manner may constitute an access control system that operates in conjunction with an access control unit and a computer.

Preferred embodiments according to the present invention are described in detail below with reference to the accompanying drawings.

Referring to FIGS. 4 and 5, when a user approaches a location at which two indicators are viewed as a single one while viewing the two indicators 301a or 301b, and 305a or 305b and is then positioned such that the single indicator is located between his or her two eyes, images of the two eyes of the user that have been outside the angles of view (indicated by dotted lines) of left and right cameras 302a or 302b, and 303a or 303b enter the angles of view of the left and right cameras 302a or 302b, and 303a or 303b. In particular, when a user having a large difference in the field of vision between his or her two eyes is guided to a close location while viewing the two indicators 301a or 301b, and 305a or 305b through the half mirror 304a or 304b, only the right indicator 305a or 305b or left indicator 301a or 301b of the two indicators 301a or 301b, and 305a or 305b is visible to an eye having a wider field of vision at the time at which the user reaches a specific location. This location corresponds to the ranges of the angles of view of the left and right cameras 302a or 302b, and 303a or 303b, and the two eyes of the user fall within the angles of view of the left and right cameras 302a or 302b, and 303a or 303b.

Figure 6:
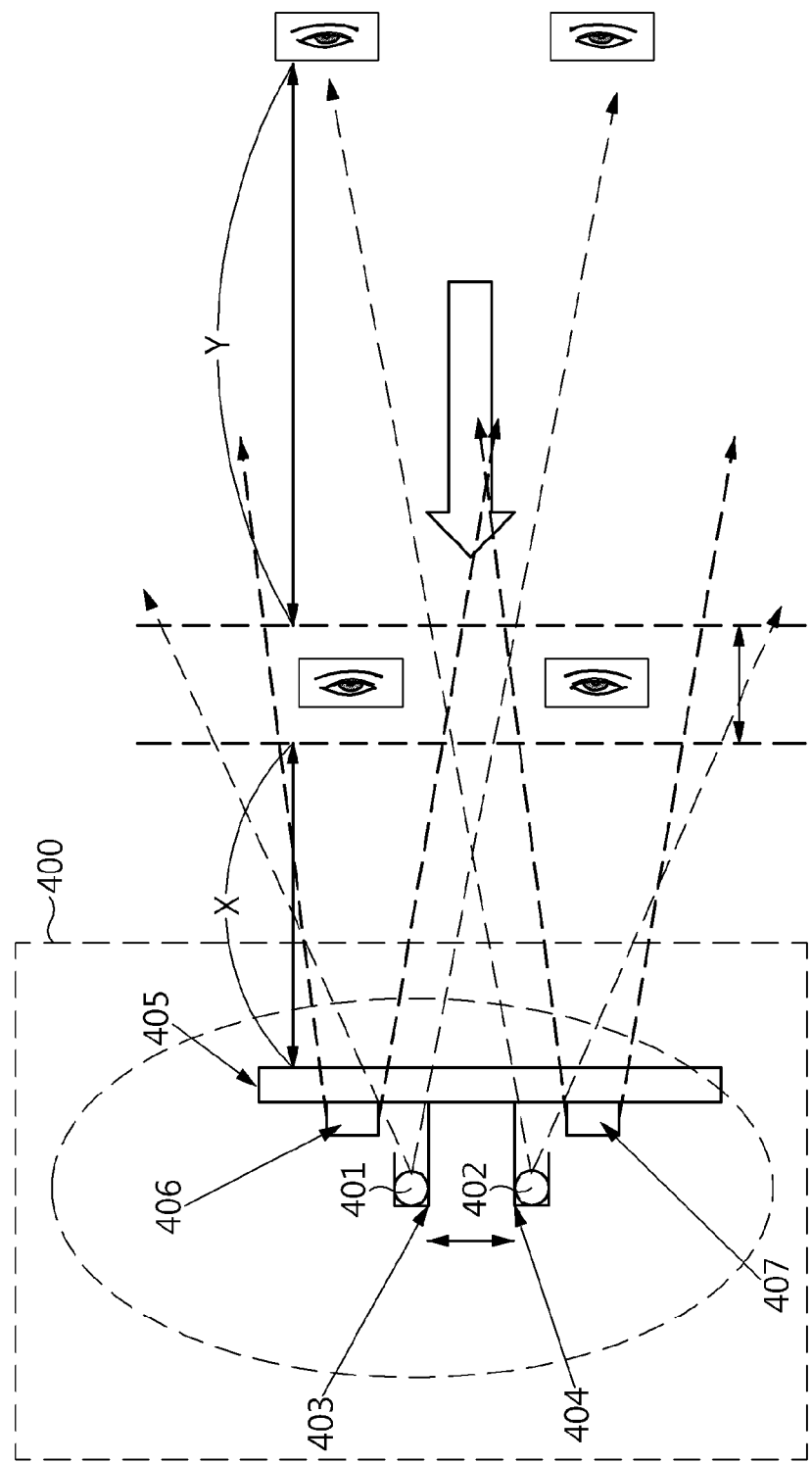
FIG. 6 is a horizontal sectional view of a device for capturing images of the irises according to the present invention.

FIG. 6 is a schematic diagram of an apparatus 400 for capturing images of the irises according to the present invention.

It is assumed that the interval between the centers of the two eyes of a common user is in the range from 7 to 9 cm and the distance X from a half mirror 405 to the user is in the range from 30 to 37 cm. The distance over which an object moves due to a difference in the field of vision between the two eyes causes the two indicators 401 and 402 to be located, in parallel with the half mirror 405, at locations 0.5 to 1.5 cm away from the center of the half mirror 405 to the left and to the right based on a relation in which the ratio of the size of an object to the size of a mirror is ½. In this case, if the distance between the two indicators 401 and 402 (in the claims, a first light source and a second light source) is longer or shorter, the two indicators 401 and 402 are viewed as a single indicator before or after the user is located 30 to 37 cm away from the half mirror.

LEDs are preferably used as the two indicators 401 and 402 employed in the present invention. In order to adjust the angle of view of each of the indicators 401 and 402, a cylindrical tube 403 or 404 (in the claims, a first duct or a second duct) through which light passes is disposed between the indicator 401 or 402 and the half mirror 405. In order to prevent light from leaking through the fixed portions of the indicators 401 and 402, it is preferred that the indicators 401 and 402 come into completely close contact with the cylindrical tubes 403 and 404. It is preferred that the materials of the cylindrical tubes 403 and 404 are opaque and absorb light. It is preferred that the insides of the cylindrical tubes 403 and 404 are threaded and, thus, prevent light from being diffracted and scattered at the ends of the cylindrical tubes. It is preferred that the internal diameters of the cylindrical tubes 403 and 404 are approximately the internal diameters of the indicators. Since the indicators 401 and 402 should be laterally aligned with respect to the half mirror 405, the cylindrical tubes 403 and 404 are disposed perpendicular to the indicators and the half mirror. It is preferred that the interval between each of the indicators 401 and 402 and the half mirror 405 is in the range of 2.5 to 4.5 cm. In this case, in order to increase the view areas of the left and right indicators 401 and 402, it is preferred that the half mirror-side sections of the cylindrical tubes 403 and 404 are formed at an oblique angle in the range of 60 to 80 degrees, thereby considerably limiting the center-side irradiation angle of the half mirror 405 compared to the outside angles thereof.

Unless the center-side irradiation angle of the half mirror is appropriately adjusted via the cylindrical tubes 403 and 404 as described above, the two indicators 401 and 402 are viewed as a single indicator before or after the user arrives at a location that is an appropriate distance away from the half mirror.

In order to also overcome problems occurring in users having large differences in the field of vision between their two eyes, areas are allocated using two indicators 401 and 402 in the side of the apparatus 400 for capturing images of the irises. Furthermore, regardless of the difference in the field of vision between the two eyes, when a user approaches, the user is guided into an operation area from a remote location outside the operation area using the two indicators 401 and 402. The user is guided to a close location while viewing the two indicators 401 and 402. When the user enters the operation area between distances X and Y, only one of the two indicators 401 and 402 is visible to each of the eyeballs of the user.

When a user views only a single indicator, the left and right eyes are located within respective angles of view of the left and right cameras 406 and 407 of the apparatus 400 for capturing images of the irises, iris image capture equipment (not illustrated) captures images of the irises.

7-color LEDs may be employed for the indicators 401 and 402 that are used in the present invention. In this case, an advantage arises in that various light source colors can be provided, and thus corresponding light source colors are displayed in various cases, such as the case where the user is guided into the operation area, the case where the user is located excessively away from or close to the apparatus 400 for capturing images of the irises, the case where the user is located within the operation area, etc., thereby enabling the user to recognize the situations.

Figure 7:
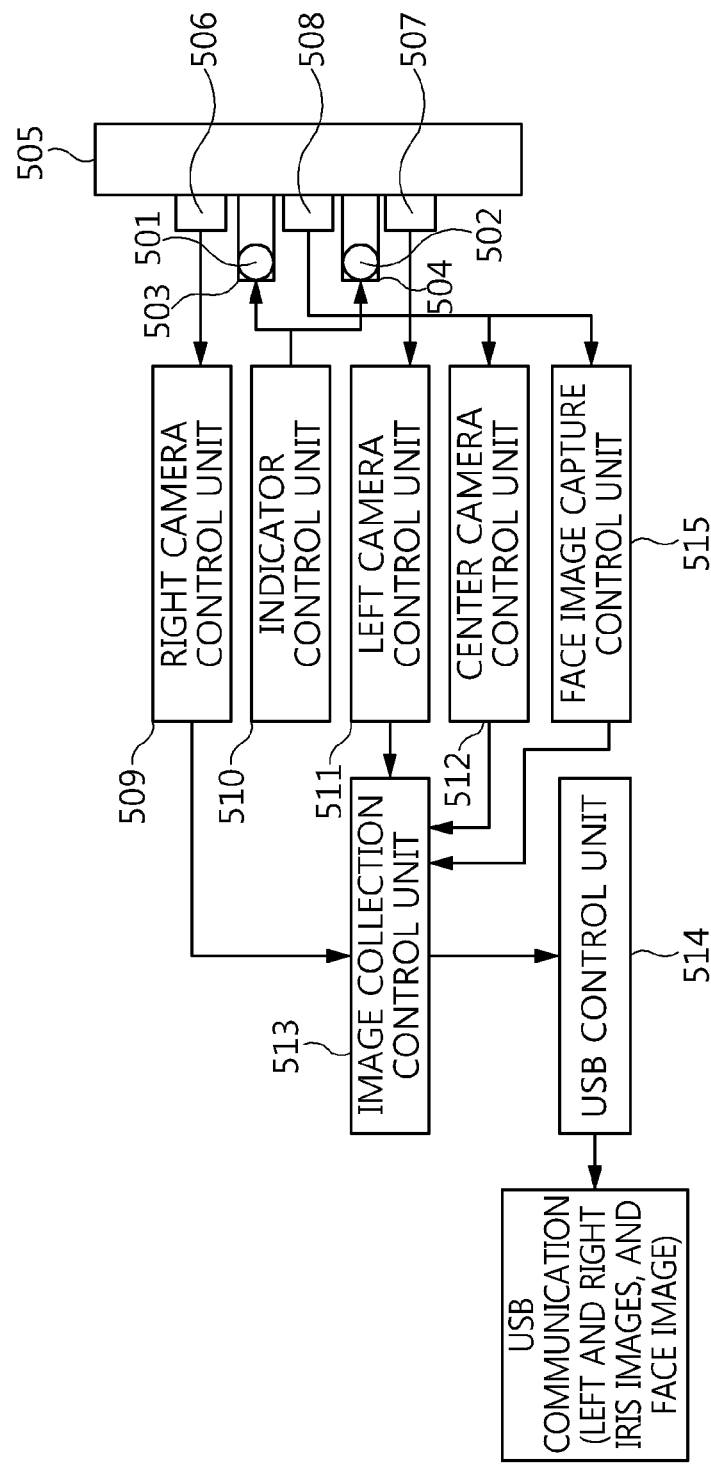
FIG. 7 is a configuration diagram of the device for capturing images of the irises according to the present invention.

A device for capturing images of the irises according to the present invention may be configured, as illustrated in FIG. 7. The device for capturing images of the irises includes a half mirror 505 configured to indicate the situation of gazing at the device for capturing images of the irises to the user, two indicators 501 and 502, two cylindrical tubes 503 and 504 configured to fix the angles of view of the indicators, two camera control units 509 and 511 configured to capture images of the left and right irises, a center camera control unit 512 configured to obtain a distance via a center camera 508 and identify an object (the face), an indicator control unit 510 configured to operate the indicators 501 and 502, an image collection control unit 513 configured to collect the images of the left and right irises, and a USB control unit 514 configured to transmit the iris images to a PC or the like.

Figure 8:
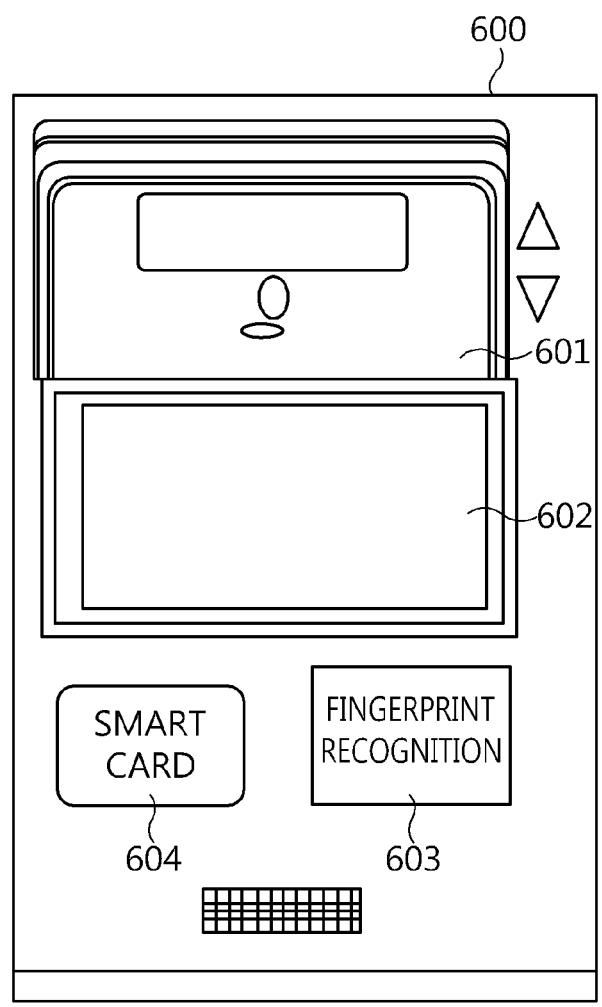
FIG. 8 is a front view of a user recognition device for access control according to the present invention.

FIG. 8 is a front view of a user recognition device for access control according to the present invention.

Referring to FIG. 8, a user recognition device 600 for access control according to the present invention includes not only an iris recognition unit 601 but also an LCD panel unit 602, a fingerprint recognition unit 603 and a smart card recognition unit 604.

The iris recognition unit 601 is formed by applying an iris recognition algorithm to the rear stage of the device for capturing images of the irises illustrated in FIG. 7. In this case, the iris recognition algorithm may be one of various methods that are known in the corresponding technical field.

The fingerprint recognition unit 603 recognizes a user through the recognition of a fingerprint of the user.

The smart card recognition unit 604 recognizes the user through the recognition of a smart card of the user.

The LCD panel unit 602 receives data through the recognition of the touches of the user, and provides a user interface to the user.

In this case, the LCD panel unit 602 may be an additional service device that provides a keypad function, a current time display function, and a simple interface. For example, the LCD panel unit may be a product of 5 or less inches, and may provide a full color touch function.

Figure 9:
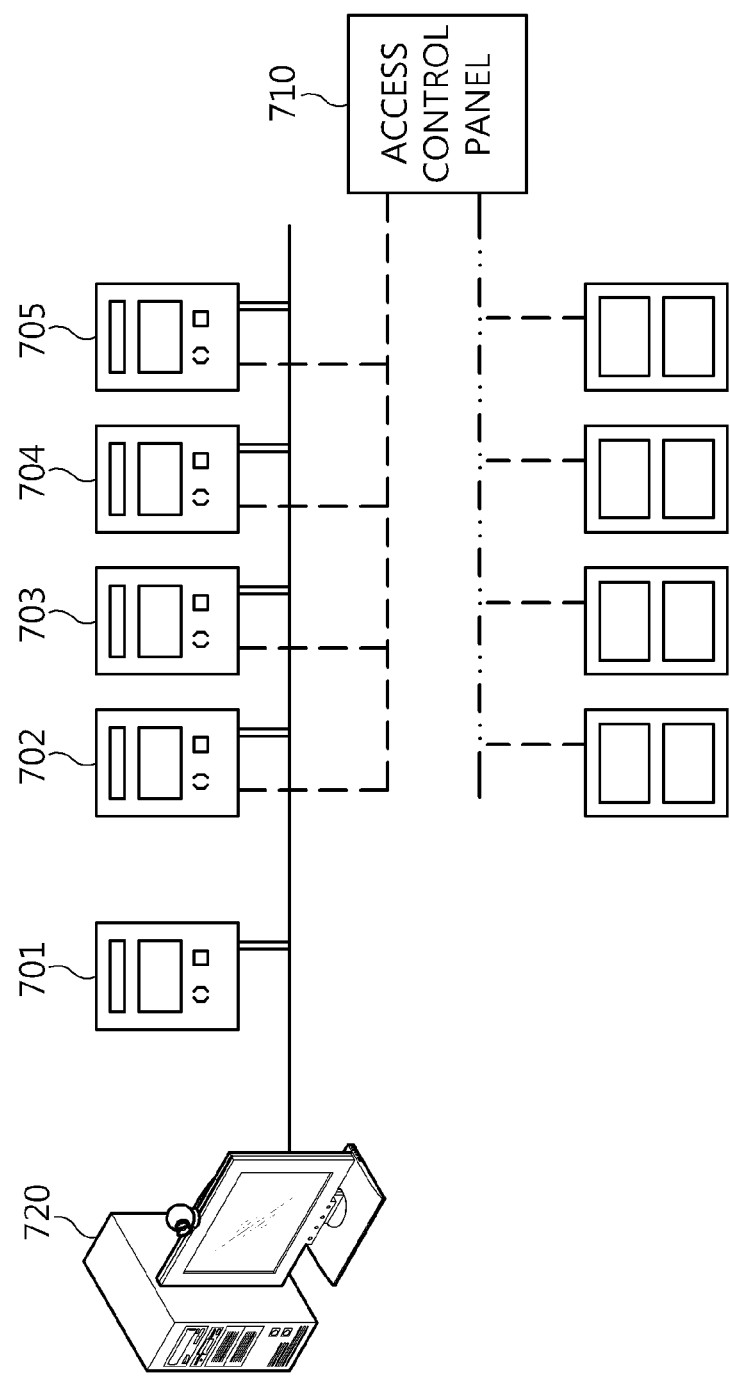
FIG. 9 is a configuration diagram of an access control system including user recognition devices for access control according to the present invention.

FIG. 9 is a configuration diagram of an access control system including user recognition devices for access control according to the present invention.

As illustrated in FIG. 9, one user recognition device 701 is used as a registration device and the other user recognition devices 702, 703, 704, 705, . . . are used as user recognition devices for access control, thereby constructing an access control system that operates in conjunction with an access control unit 710 and a computer 720.

Figure 10:
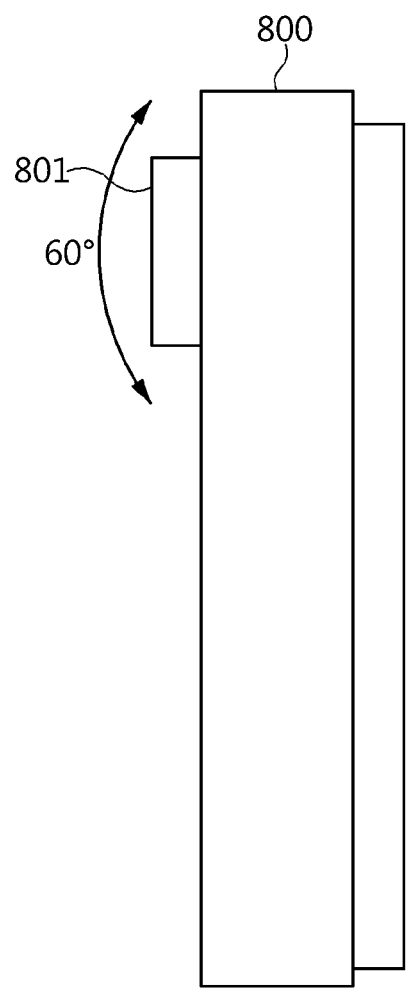
FIG. 10 is a diagram illustrating that the iris recognition unit of a user recognition device for access control according to the present invention is rotatable in upward and downward directions.

FIG. 10 is a diagram illustrating that the iris recognition unit of a user recognition device for access control according to the present invention is rotatable in upward and downward directions.

As illustrated in FIG. 10, a user recognition device 800 includes a step motor unit 801 and, thus, enables cameras to be rotated in the range of 30 degrees in an upward direction and 30 degrees in a downward direction, thereby making the angle of view of each of the left and right cameras of the iris recognition unit 60 degrees.

The invention claimed is:

1. A device for capturing images of irises, comprising:
a first light source adapted to correspond to a left eye;
a second light source adapted to correspond to a right eye;
a first duct disposed close to the first light source, and configured to limit an irradiation angle of the first light source;
a second duct disposed close to the second light source, and configured to limit an irradiation angle of the second light source;
a half mirror configured to transmit light emitted by the first and second light sources to irradiate the left and right eyes, and also configured to reflect appearances of the left and right eyes; and
left and right cameras configured to capture the left and right eyes to perform iris recognition,
wherein a center of the half mirror is located at a midpoint between the first and second light sources,
wherein a distance between the first and second light sources is set such that, when a location of a user corresponding to the left and right eyes is a preset distance away from the half mirror, the user recognizes the first and second light sources as a single light source, and
wherein the preset distance ranges from 30 to 37 cm, and the distance between the first and second light sources ranges from 1 to 3 cm.

2. The device of claim 1, wherein a distance between each of the first and second light sources and the half mirror ranges from 2.5 to 4.5 cm.

3. The device of claim 2, wherein the first and second ducts are respective cylindrical tubes in close contact with the first and second light sources, and half mirror-side sections of the cylindrical tubes are formed at an oblique angle ranging from 60 to 80 degrees, thereby significantly limiting a center-side irradiation angle of the half mirror compared to an outside angle thereof.

4. The device of claim 3, wherein the first and second ducts are arranged perpendicular to an extended direction of the half mirror.

5. The device of claim 4, wherein the first and second ducts comprise respective threads formed in insides of cylinders.

6. A user recognition device for access control, comprising:
an iris recognition unit configured to capture left and right eyes and then recognize a user through iris recognition;
a fingerprint recognition unit configured to recognize the user through recognition of a fingerprint of the user;
a smart card recognition unit configured to recognize the user through recognition of a smart card of the user; and
an LCD panel unit configured to receive data through recognition of one or more touches of the user and provide a user interface to the user,
wherein the iris recognition unit comprises:
a first light source adapted to correspond to the left eye;
a second light source adapted to correspond to the right eye;
a first duct disposed close to the first light source, and configured to limit an irradiation angle of the first light source;
a second duct disposed close to the second light source, and configured to limit an irradiation angle of the second light source;
a half mirror configured to transmit light emitted by the first and second light sources to irradiate the left and right eyes, and also configured to reflect appearances of the left and right eyes, and
left and right cameras configured to capture the left and right eyes to perform the iris recognition,
wherein the iris recognition unit is rotatable in upward and downward directions so that an angle of view of each of the left and right cameras is in a range of 30 degrees in the upward direction and 30 degrees in the downward direction,
wherein a distance between the first and second light sources is set such that, when a location of the user corresponding to the left and right eyes is a preset distance away from the half mirror, the user recognizes the first and second light sources as a single light source, and
wherein the preset distance ranges from 30 to 37 cm, and the distance between the first and second light sources ranges from 1 to 3 cm.

7. The user recognition device of claim 6, wherein a distance between each of the first and second light sources and the half mirror ranges from 2.5 to 4.5 cm.

8. The user recognition device of claim 7, wherein the first and second ducts are respective cylindrical tubes in close contact with the first and second light sources, and half mirror-side sections of the cylindrical tubes are formed at an oblique angle ranging from 60 to 80 degrees, thereby significantly limiting a center-side irradiation angle of the half mirror compared to an outside angle thereof.

9. The user recognition device of claim 8, wherein the first and second ducts are arranged perpendicular to an extended direction of the half mirror.

10. The user recognition device of claim 9, wherein the first and second ducts comprise respective threads formed in insides of cylinders.

* * * * *